Dec. 18, 1956 E. J. RABENDA 2,774,429

MAGNETIC CORE CONVERTER AND STORAGE UNIT

Filed May 28, 1953 4 Sheets-Sheet 1

INVENTOR
EDWARD J. RABENDA
BY William V. Schelberg
AGENT

Dec. 18, 1956 E. J. RABENDA 2,774,429

MAGNETIC CORE CONVERTER AND STORAGE UNIT

Filed May 28, 1953 4 Sheets-Sheet 2

INVENTOR
EDWARD J. RABENDA
BY William V. Schelling
AGENT

Dec. 18, 1956 E. J. RABENDA 2,774,429

MAGNETIC CORE CONVERTER AND STORAGE UNIT

Filed May 28, 1953 4 Sheets-Sheet 3

INVENTOR
EDWARD J. RABENDA
BY William V. Schellberg
AGENT

Dec. 18, 1956 E. J. RABENDA 2,774,429

MAGNETIC CORE CONVERTER AND STORAGE UNIT

Filed May 28, 1953 4 Sheets-Sheet 4

INVENTOR
EDWARD J. RABENDA
BY William V. Schelberg
AGENT

United States Patent Office 2,774,429

Patented Dec. 18, 1956

2,774,429

MAGNETIC CORE CONVERTER AND STORAGE UNIT

Edward J. Rabenda, Poughkeepsie, N. Y., assignor to International Business Machines Corporation, New York, N. Y., a corporation of New York Application May 28, 1953, Serial No. 358,101

10 Claims. (Cl. 164—115)

The present invention relates to accounting machines and is directed, in particular, to a system whereby information sensed from a standard record card in decimal form is stored in a magnetic element matrix in modified binary form, and, subsequently, may be read out of the matrix in the modified binary form and recorded in one or more increased capacity record cards or other recording medium.

An object of the invention, therefore, is to provide an improved device adapted to convert data from decimal to modified binary form.

A further object of the invention is to provide a system for simultaneously converting decimal information into a modified binary form and storing the binary information so that it may be recorded thereafter in one or more duplicated records.

Still another obect of the invention is to provide a system whereby information, recorded in decimal form in a first record card, is read and stored in modified binary form in a magnetic element storage matrix, from which storage unit the information may be read out and recorded on selectable portions of a record card of increased capacity or on a plurality of such cards in duplicated fashion, as desired.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1 and 2 illustrate the standard and increased capacity record cards respectively.

Figs. 3 and 4 taken together, constitute a schematic wiring diagram of the circuits and mechanism for reading decimal information into a storage device in modified binary form, and for reading out the information in the modified binary form for recording.

Figure 1:
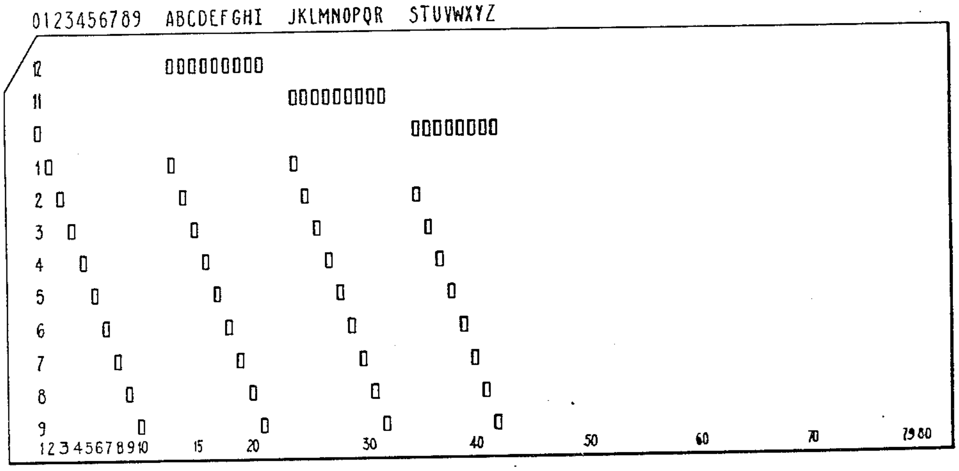

Referring to Fig. 1, it will be noted that a standard record card is provided with eighty vertical columns each having twelve perforation positions. The ten lower positions are assigned to the digits 0 to 9 and the top two positions designated 11 and 12 (or X and R) are used for special coding such as algebraic sign or, in combination with one of the digits 1 to 9, for alphabetical representation. Each punched column will accommodate either one digit, one alphabetical character or one special character such as the algebraic sign of a number. For alphabetical representation, two perforations in a single column are used for each letter; one of these is a zone perforation (0, 11, or 12) while the other is a digit perforation. A total of eighty numerical or alphabetical characters may be recorded in each standard record card. The following table illustrates the coding employed to represent numerals and the alphabet on the standard record card:

| Zone digit | No. zone | 12 (R) zone | 11 (X) zone | Zero zone |
|---|---|---|---|---|
| Blank | ------ | + | – | 0 |
| 1 | 1 | A | J | / |
| 2 | 2 | B | K | S |
| 3 | 3 | C | L | T |
| 4 | 4 | D | M | U |
| 5 | 5 | E | N | V |
| 6 | 6 | F | O | W |
| 7 | 7 | G | P | X |
| 8 | 8 | H | Q | Y |
| 9 | 9 | I | R | Z |

Figure 2:
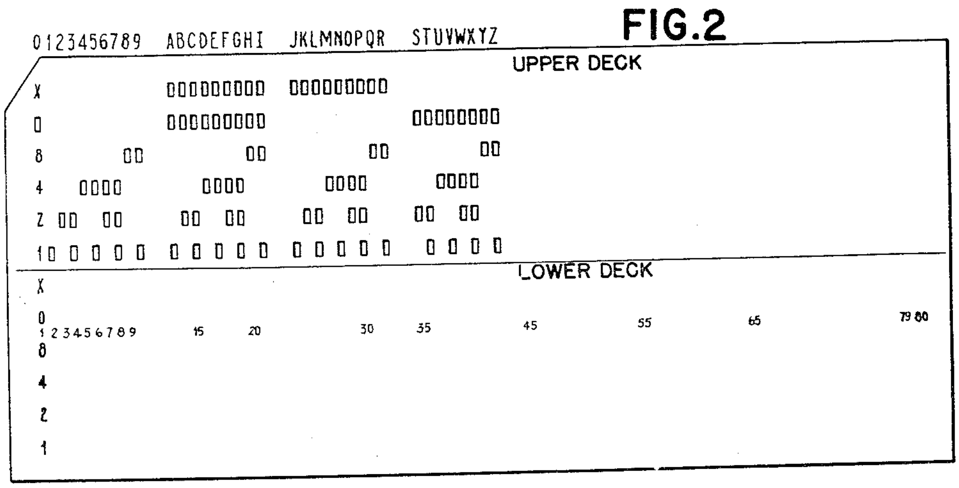

Fig. 2 illustrates one form of an increased capacity card having upper and lower sections or decks of eighty columns each or a total of one hundred and sixty columns. Each column has six perforation positions designated X, 0, 8, 4, 2 and 1 in accordance with a modified binary code form. With such a code, one or more perforations are required in each column to represent the digits 0–9. The digits 0, 1, 2, 4 and 8 are represented by a single perforation in the correspondingly designated position while digit 3 is represented by perforations in positions 1 and 2, digit 5 by perforations in positions 1 and 4, digit 6 by perforations in positions 2 and 4, digit 7 by perforations in positions 1, 2, and 4, and digit 9 by perforations in positions 1 and 8. Alphabetical characters are again represented by combinations of perforations in the control or zone positions and in the digit positions. With twice the number of columns, each capable of representing one digit or letter, the storage capacity of this type punched card is double that of Fig. 1.

The following table illustrates the coding employed to represent the alphabet and numerals on the increased capacity record card:

| Zone digit | No. zone | X and 0 | X | 0 |
|---|---|---|---|---|
| Blank | ------ | ------ | ------ | 0 |
| 1 | 1 | A | J | |
| 2 | 2 | B | K | S |
| 3 | 1, 2 | C | L | T |
| 4 | 4 | D | M | U |
| 5 | 1, 4 | E | N | V |
| 6 | 2, 4 | F | O | W |
| 7 | 1, 2, 4 | G | P | X |
| 8 | 8 | H | Q | Y |
| 9 | 1, 8 | I | R | Z |

Figure 3:
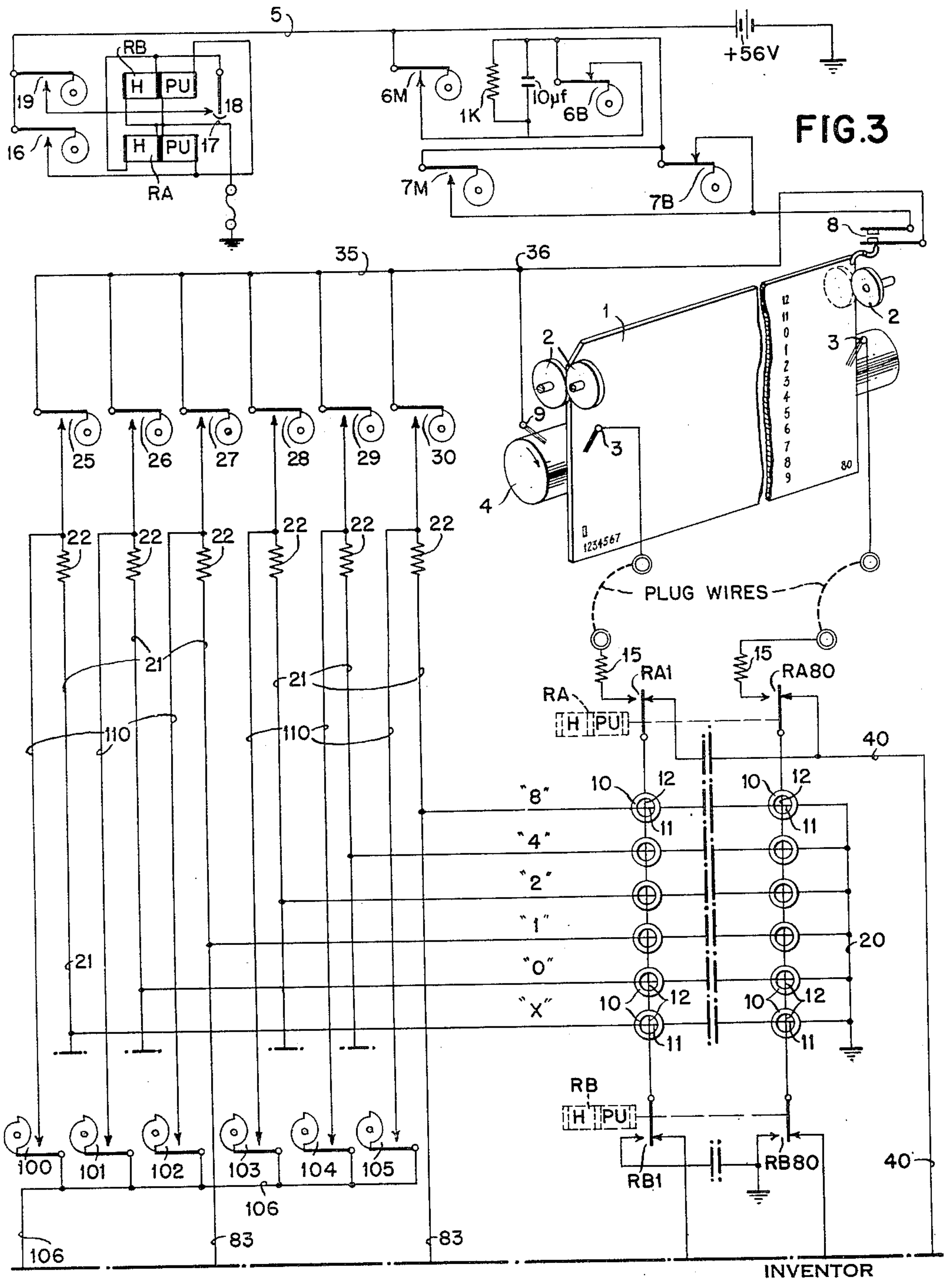
Figure 6:
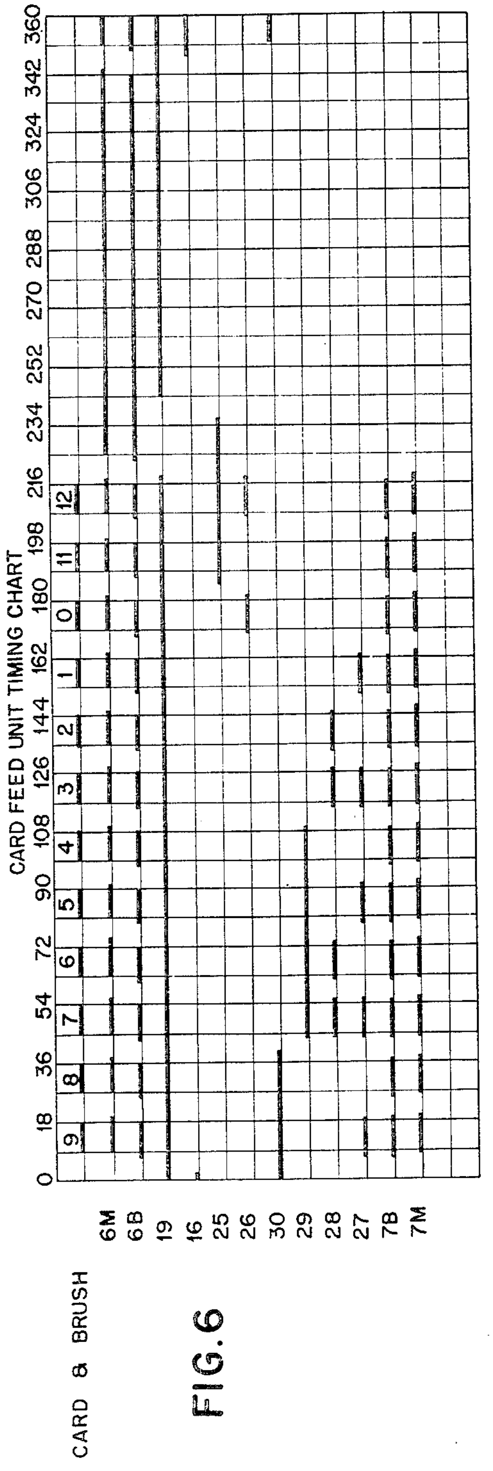
Fig. 6 is a timing diagram for the cam controlled switching devices associated with the card sensing unit illustrated in Figs. 3 and 4.

Referring to Fig. 3, a record card 1 of the standard 80 column type described in connection with Fig. 1, is advanced by sets of feed rollers 2 past brushes 3. Eighty laterally positioned brushes 3 are provided, one for each column of the card, and the cards are fed successively from a supply hopper (not shown) to the feed rollers with the 9's positions first. Each of the brushes 3 concurrently senses like digit representing perforations in the card columns by making contact with a conductive roller element 4 through the perforations. The roller element 4 is energized from a +56 volt line 5 through pairs of cam operated contacts 6M and 6B and card feed contacts 7M and 7B, card lever contacts 8 and a brush 9 which is positioned in contact with the roller. The cam contacts labeled 6 and 7 are driven in synchronization with the feed rollers 2 and are timed to close as shown in Fig. 6 where the heavy lines indicate the time intervals during which the contacts are closed.

The above described sensing operation converts the data recorded by perforations into electrical signals which appear in the brush circuits at differential times in the card reading cycle indicative of the numerical value assigned to the perforation position. The information thus converted into differentially timed electrical impulses is then stored in a two dimensional magnetic core storage matrix in the modified binary form and may be later read out either once or repeatedly as will be described hereafter.

The magnetic core matrix storage device is illustrated in Fig. 3 and consists of a plurality of annular bistable magnetic core elements 10 arranged in columns corresponding in number to the columns of the record card, for example eighty, and having in each column a number of cores corresponding to the modified binary code characters X, 0, 8, 4, 2 and 1. Columns 1 and 80 only are shown in the figure since each of the columns are identical and further duplication would unnecessarily confuse the drawing. Each core 10 is provided with two windings labeled 11 and 12. Winding 11 consists of one turn passing through the cores in each column which represent similar binary code positions. Winding 12 consists of a plurality of turns, for example 50, passing through all the cores in a given column.

Figure 5:
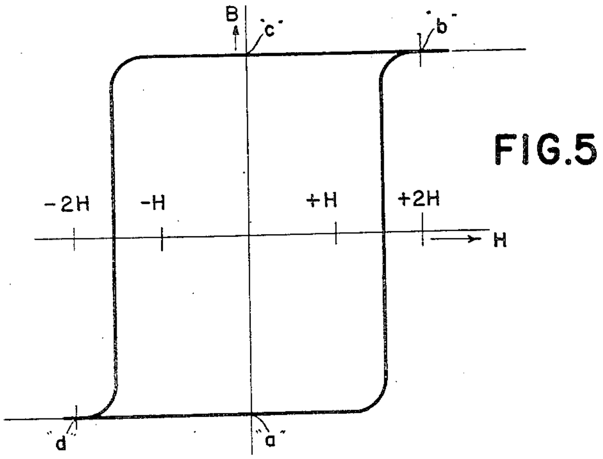
Fig. 5 is a diagram of the ideal hysteresis characteristic of the magnetic cores which comprise the storage elements of the matrix.

Magnetization of a core 10 to one remanence state is arbitrarily chosen as a binary "zero" condition and to the other remanence state as a binary "one" condition. Having once been magnetized in a particular remanence state, the core will retain that state until application of a suitable M. M. F., in a reverse sense. Referring now to Fig. 5, if a "zero" state is selected as point "*a*" on the hysteresis loop illustrated, application of an M. M. F. of +2H will cause the core to traverse the curve to saturation point "*b*" and, on removal of the applied M. M. F., returns to point "*c*" which represents a stored "one." Application of an M. M. F. of +H would be insufficient to cause such a transfer and on removal of the applied +H M. M. F., the core would return to the zero point "*a*." Similarly, with a "one" stored, application of an M. M. F. of —2H will cause the core to traverse its hysteresis loop from point "*c*" to point "*d*" and, on its removal, to point "*a*" while an M. M. F. of —H will leave the final remanence state of the core unchanged.

During a card sensing operation, one terminal of each of the windings 12 is connected by means of a plugwire to a corresponding one of the brushes 3 through the normally open contact of a relay RA and a resistor 15 of approximately 2.2K or 2,200 ohms. The other terminal of each the windings 12 is connected to ground through the normally open contact of a relay RB. The relays RA and RB are given subscript designations corresponding to the card columns to which they are related with only relays RA1, RA80, and RB1, RB80 illustrated to avoid duplication, as pointed out above. The operating windings for relays RA and RB are shown in the upper part of the figure and are energized through a cam operated contact 16 which closes as shown in the timing chart of Fig. 6 wherein the time intervals of contact closure are indicated in degrees of a card feed cycle comprising 360°. Closure of contacts 16 completes a circuit from the +56 volt line 5 to pick up coils PU of each of the relays and through lead 17 to ground. As these pickup coils are energized, the contacts of each of the relays RA and RB close and in addition, normally open front contact 18 of relay RB closes to complete a circuit from line 5 through a cam operated switch 19, contacts 18, hold windings H of each of the relays and through the lead 17 to ground. The sequence of closure of the contacts 16 and 19 may be observed from Fig. 6 with contact 16 closed at 348°, in the card feed cycle and opened at 2° in the succeeding cycle and contact 19 initially closed at 243° and remaining closed until 220° in the succeeding card feed cycle so that the contact 19 is closed at the time contacts 16 open to thereby maintain the hold windings H of relays RA and RB in an energized state until completion of the card sensing operation as will be more fully described.

One terminal of each of the matrix windings 11 is connected to a grounded conductor 20 and the other terminal is connected through a lead 21 and a resistor 22 of approximately 40 ohms to a terminal of one of a set of cam operated contacts 25 to 30. The other terminal of each of the cam contacts 25 to 30 is connected to a lead 35 which is coupled to the circuit energizing the conductive roller 4 at a terminal 36. The closure intervals of contacts 25 to 30 are shown in the timing chart of Fig. 6 and it will be observed, for example, that the contact 25 closes at 185° and remains closed until 236° in the card feed cycle. During this time interval, contacts 6 and 7 are closed and opened two distinct times coincident with passage of the 11 and 12 control positions of the card under the brushes 3. At these two times, the terminal 36 is energized at a potential of +56 volts and current flows through line 35, closed contacts 25, resistor 22, line 21, and winding 11 of the "X" row of cores of the matrix to grounded conductor 20. The resistor 22 is so proportioned in relation to the applied voltage that a M. M. F. of +H is produced in each of the cores linked by the winding 11 of the "X" row. It will be recalled that, with the cores in a zero state or at point "*a*" on their hysteresis curve, application of an M. M. F. of +H will not change the final bistable remanence state and on removal of this force, the core will remain in state "*a*." If a perforation is sensed in the card at the 11 or 12 position, however, a pulse of current flows through the brush 3, the plugwire, resistor 15 and the normally open contacts of the relay RA associated with the particular record card column, which are closed during card reading as described, and traverses the winding 12 and the normally open contacts of relay RB to ground. The resistor 15 and the number of turns of winding 12 are so proportioned with relation to the applied voltage that an M. M. F. of +H is also produced in each of the cores of that matrix column. Coincident application of an M. M. F. of +H in both the winding 12 and the winding 11 represents a total M. M. F. of +2H at the core 10 and is sufficient to cause the core to change its state of remanence. Each core in the particular column is subjected to an M. M. F. of +H and each core in the X row is subjected to an M. M. F. of +H so that only the core 10 at the X position of the particular column is subjected to an M. M. F. of +2H and, therefore, point "*a*" to point "*c*" on their hysteresis loops.

Referring again to the timing chart, it will be noted, for example, that contact 26 is closed between 207° and 218° in the card feed cycle which time interval is coincident with reading of the 12 position row of the card. The winding 11 associated with the "0" row of cores of the matrix is therefore subjected to an M. M. F. of +H during the time that the 12 position is sensed by the brushes 3. If a perforation were sensed in the 12 position, therefore, both the cores in the "0" and "X" positions of the particular column are subjected to a force of +2H and change their remanence states from point "*a*" to point "*c*" on their hystersesis loops.

Similarly, each of the contacts 25 to 30 are arranged to close during the time that particular ones of the decimal characters are sensed which requires energization of the winding 11 corresponding to the code arrangement. When the 9's positions are read, contacts 27 and 30 are closed to energize the windings 11 linking the "8" and "1" rows of cores. When the 8's positions are read, only contact 30 is closed. When the 7's positions are read, contacts 27, 28 and 29 are closed to energize the windings 11 linking the "1," "2" and "4" rows of cores. Similarly, when the 6's positions are read, contacts 28 and 29 are closed; the 5's positions, contacts 27 and 29 are closed; the 4's positions, contacts 29 are closed; the 3's positions, contacts 27 and 28 are closed; the 2's positions, contacts 28 are closed; the 1's positions, contacts 27 are closed and, when the 0's positions are read, contacts 26 are closed.

Figure 7:
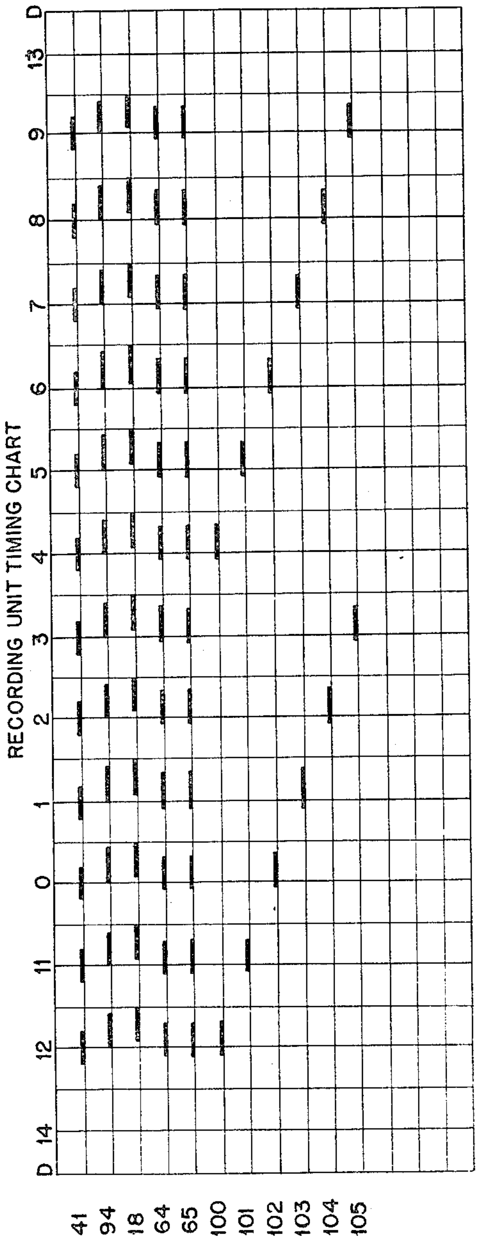
Fig. 7 is a timing diagram for the cam controlled switching devices associated with the recording unit illustrated in Figs. 3 and 4.

As each digit row of the record card is sensed, certain of the cores of the matrix are caused to change their static magnetic states and, as the sensing cycle is terminated, the relays RA and RB are deenergized by the opening of contacts 19 at 220° as may be observed from the sensing unit timing chart (Fig. 6). As the relays RA and RB are deenergized, their normally closed contacts are reclosed. The upper terminal of each of the windings 12 is thereby connected through the normally closed contacts of the corresponding relay RA to a conductor 40 which completes a circuit through a switch 41 (Fig. 4) to a source of voltage 42 of approximately +56 volts. A polarity trap comprising a semi-conductor 43 is connected between the conductor 40 and ground for a purpose to be later described. The switch 41 is cam operated and driven in synchronism with the recording unit. Closure times of the essential contacts of the recording unit are indicated in Fig. 7 and are here represented in terms of card cycle points, with the particular recording unit employed requiring 14 points for a complete cycle and each point occupying approximately 25.70 degrees of a complete 360 degree cycle.

The lower terminal of each of the windings 12 is connected through the normally closed contacts of the associated relay RB to a terminal 50 (Fig. 4) which is coupled through a condenser 51 of 0.005 μf. capacity to the control grid 52 of a corresponding thyratron 53. Terminal 50 is also coupled to plate 54 of the thyratron through a series connected inductance coil 55 and resistor 56 of approximately 2K ohms. The cathode 57 and screen grid 58 of thyratron 53 are grounded as shown, and the control grid is additionally connected to a bias source of approximately −19 volts through a resistor 59 and conductor 60. The conductor 60 is connected to ground through a 0.01 μf. condenser 61 and to the midpoint of a resistor bridge 62 which comprises two pairs of series parallel connected resistors connected at one end to a negative source of voltage of −100 volts and at the other end through a pair of paralleled cam operated contacts 64 and 65 to ground. These contacts close periodically, as shown in the timing chart of Fig. 7, and connect the other terminals of the resistor bridge 62 to ground. With these contacts closed, current flows from the −100 volt source through the bridge 62 to ground and provides a potential of approximately −19 volts for biasing the grid 52 of the thyratron while with the contacts 64 and 65 open, a bias of −100 volts is applied for a purpose to be later described. The plate 54 of each of the thyratrons 53 is connected by a conductor 69 and a plugwire to one terminal of a corresponding magnet winding 70 which is provided for operation of the illustrated recording mechanism. The other terminal of each of the windings 70 is connected to the aforementioned lead 40 which is energized at a potential of +56 volts on closure of switch 41. As shown in the figure, only the thyratron 53, magnet 70 and associated circuitry corresponding with the first and last matrix column are illustrated, however, it is to be understood that one such unit is provided for each column or a total of eighty units.

The recording mechanism is diagrammatically illustrated as a punch device comprising eighty punch elements 71 and coacting punch dies 72, one for each card column, with only the first and last elements being shown in the figure. All like digits are punched simultaneously as the increased capacity card is fed *x* positions first through the recording unit, i. e., all *x*'s punch, card moves, all 0's punch, card moves, all 8's punch, etc. The card is maintained at rest when punching occurs and moved intermittently between punching operations by a conventional Geneva type driving mechanism not shown. Each of the punch elements 71 pivotally carries an interponent 73 which is normally out of the path of motion of a continuously oscillating punch-depressor plate 74. The plate 73 or punch bail is operated through connecting rods 74a by eccentrics 74b mounted on a rotating shaft 74c. The operating magnets 70, upon energization, act through an armature lever and link member 70a to hook the interponent 73 to the bail 74 during its downward stroke and accordingly, the selected punch elements 71 are driven through the card to produce a perforation.

Figure 4:
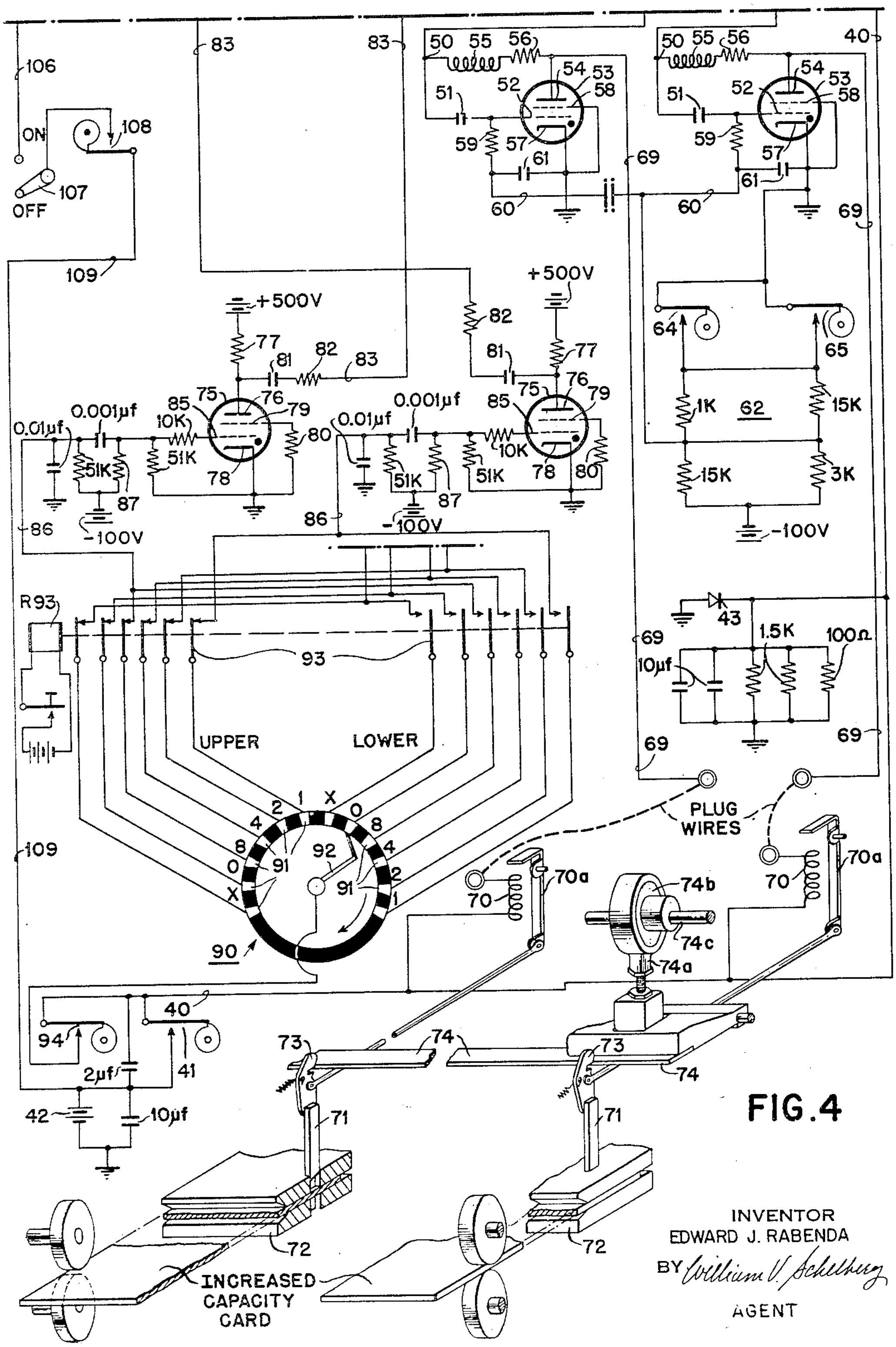

A thyratron read-out control tube 75 is provided for each row winding 11 of the storage matrix with only two such units illustrated in Fig. 4 and connected with the windings 11 associated with the "1" and the "8" position in order to avoid unnecessary duplication and confusion of the drawings, it being understood that one unit including a tube 75 is provided for each one of the windings 11. The plate 76 of the read-out control tube is connected to a positive source of voltage of +500 volts through a resistor 77 of approximately 1.1 megohms, and the cathode 78 and screen grid 79 are grounded, the latter through a resistor 80 of approximately 10K ohms. One terminal of a condenser 81 is connected to the plate 76, and the other terminal is connected through a resistor 82 of approximately 22 ohms and through a lead 83 to the ungrounded terminal of the windings 11 (Fig. 3) pertaining to the "1" and "8" rows of cores. The control grid 85 of each read-out thyratron is connected to a lead 86 through a condenser coupled grid circuit network, and is normally biased negatively by a −100 volt source which is connected to the network through a resistor 87 of approximately 10K ohms. The lead 86 is connected through contacts of a switch 93 to a read-out emitter 90 which is provided with a plurality of contacts 91 labeled X, 0, 8, 4, 2 and 1 arranged in two groups in the order listed. The switch 93 has an operating magnet R93, which may be controlled manually or otherwise, and is provided to connect the leads 86 to either one of the two groups of emitter contacts and functions to cause the stored information to be recorded in either the upper or lower deck of the increased capacity card. A brush arm 92 is driven in synchronism with the shaft 74c and feed rollers (not shown) of recording unit and is energized through a circuit traced through a contact 94 and the cam switch 41 to the +56 volt source 42. In this manner the punch elements 71 are in alignment with the corresponding row positions of the increased capacity card at the time that the brush arm contacts the corresponding segment contact 91 of the emitter. As illustrated, the leads 86 are respectively connected to contacts "1" and "8" of the "upper" group of segments of emitter 90 and the information read out is to be recorded in the upper card deck since the left hand group of contacts 93 are closed.

A group of cam operated contacts labeled 100 to 105 (Fig. 3) are also provided in the recording unit and are operated to closed positions for time intervals as shown in the timing chart of Fig. 7. One terminal of each of the contacts 100 to 105 is connected to a lead 106 and through this lead to a readback control switch 107 and through a further set of cam operated contacts 108 and lead 109 to the +56 volt source 42. The remaining contact terminal of each of the switches 100 to 105 is connected through leads 110, resistors 22 and leads 21 to the ungrounded terminal of corresponding ones of the matrix row windings 11.

To explain the operation of the unit, the sensing, read-out and recording of a digit 9 assumed to be punched in column 1 of a standard record card will now be described.

As the card is fed to the sensing unit, the card lever contact 8 closes and the 9's row passes under the row of brushes 3 substantially coincident with closure of the cam contacts 6 and 7 (see Fig. 6). Terminal 36 is held at a potential of +56 volts as supplied from line 5 during closure of the above sets of contacts and the roller 4 is energized through the brush 9. The relays RA and RB are picked up by closure of the contacts 16 and 19 and their normally open contacts are closed. As the perforation in the 9's position of column 1 is sensed, a pulse of current passes through the resistor 15, the normally open RA contacts, and winding 12 associated with column 1, the normally open RB contacts, and returns through ground. This differential current pulse produces an M. M. F. of +H in each core comprising column 1 of the matrix. Simultaneously, the cam contacts 27 and 30 close and a positive current pulse passes from the terminal 36 through these closed cam contacts and the resistors 22, conductors 21 and the windings 11 pertaining to the "8" and "1" row of the matrix and thence to the grounded conductor 20. The pulse of current through these windings 11 is sufficient to produce an M. M. F. of +H in each core of the "8" and "1" rows of the matrix. The "8" and "1" cores of column 1 however are subjected to a total M. M. F. of +2H and only these two cores change their remanence states. As the card is advanced through the sensing unit and the 8's, 7's, etc., row positions are sensed, further pulses are applied to the windings 11 as combinations of the cam contacts 25 to 30 close corresponding to the code arrangement, however, the winding 12 of column 1, for example taken, is not pulsed further. At the end of the card sensing cycle, relays RA and RB are deenergized and the digit 9 has been stored in the matrix as represented by the changed remanence states of cores "8" and "1" in column 1.

In reading out the stored information, a pulse is applied to the row windings 11 in a direction opposite to that of read-in and of a magnitude sufficient alone to produce an M. M. F. of —2H. This M. M. F. causes those cores in which a "one" has been stored to traverse their hysteresis loops and transfer to the "zero" remanence state. The flux change then induces a voltage in the winding 12 embracing that core, which induced voltage pulse is employed for operating the magnet 70 associated therewith. At the beginning of the read-out cycle, contacts 41 and 94 close (see Fig. 7) connecting the +56 volt terminal 42 to the read-out emitter arm 92. The emitter arm is driven in synchronism with the recording unit as aforementioned so that the emitter brush contacts the segment 91 corresponding to the position of the card in the recorder under the punch elements 71. Thus, with the increased capacity card fed top edge or X position first, the emitter brush will sequentially contact the X, 0, 8, 4, 2 and 1 segments of the first group as the X, 0, 8, 4, 2 and 1 positions of the upper deck of the increased capacity card pass under the punch elements operated by the magnets 70. As the emitter brush 92 contacts segment X and cam contacts 41 and 94 are closed, a positive pulse is applied to lead 86, and the control grid circuit of the associated read-out thyratron 75. The condenser 81 is coupled to the +500 volt plate supply source as heretofore described and is normally charged to a potential of +500 volts. As the pulse applied to lead 86 overcomes the negative grid bias and tube 75 fires, the condenser 81 discharges through the tube to ground and thence through lead 20 (Fig. 3), winding 11 linking the X row of cores, lead 83, resistor 82 (Fig. 4) and back to the opposite plate of condenser 81. Thyratron 75 is now extinguished as the transient current from the capacitor 81 is dissipated since the 1.1 meg ohm resistor 77 limits the flow of current from the +500 volt plate supply source to a value insufficient to maintain conduction.

The pulse applied to winding 11 in the above manner is in a direction opposite to that of read-in and an M. M. F. of —2H is produced in the cores so as to cause those in which a "one" has been stored to traverse their hysteresis loops from point "*c*" to point "*d*" (see Fig. 5) and, when the pulse is dissipated, return to point "*a*" Cores in the X row without stored information or in the "zero" state will be unaffected by the read-out pulse, and, since none of the cores in the X row are in the "one" state, for the example taken, no change takes place. Each time the emitter brush arm 92 contacts one of the segments 91 and the cam contacts 41 and 94 close, the upper terminal of the windings 12 and the plate 54 of the thyratron 53 is connected to the +56 volt source. These circuit paths may be traced from the 56 volt source 42, through contacts 41, lead 40, normally closed contacts of relay RA1, winding 12, normally closed contacts of relay RB1, terminal 50, condenser 51, resistor 59, condenser 61 to ground and, from the +56 volt source 42, magnet 70, lead 69, the plate 54 of tube 53 and cathode 57 to ground. Therefore, each time contacts 41 close, the thyratron 53 is provided with plate potential and shortly thereafter the contacts 64 and 65 close to lower the grid bias from —100 volts to —19 volts (see Fig 6) so as to condition the tube to fire. The —100 volt grid bias is maintained until after the plate potential is applied by closure of contacts 41 in order to prevent the tube from firing at this time. Coincidentally, the contacts 94 close and the emitter brush arm 92 contacts one of the segments 91 to initiate a read-out pulse as described. When the brush arm 92 contacts the segment 91 for the "0" row of cores, no change takes place as the cores are in a "zero" remanence state and no voltage is induced in the windings 12. When the brush arm 92 contacts segment "8," however, and the read-out tube 75 fires to allow condenser 81 to discharge, the winding 11 at the "8" row of the matrix is pulsed and the "8" core in column 1, which has changed its state, again reverses and a voltage impulse is induced in winding 12 at this instant. This impulse is applied to terminal 50 and to the grid 52 of tube 53. The presence of the choke coil 55 prevents the sharply rising induced voltage impulse from passing to the plate of the tube, however, as the tube fires, current flows through winding 12, choke coil 55, resistor 56 and the tube elements in the path traced heretofore. It is to be noted at this point that the direction of current flow through winding 12 is in the same direction as for read-in and comparable in magnitudes to a sensing pulse. The magnet 70 is connected in parallel with winding 12 between the 56 volt source and the plate of tube 53 and firing of the tube 53 completes a circuit energizing the magnet so as to cause the punch element 71 to be depressed and record the information that has been stored. Following this operation, contacts 41 open to disconnect the plate supply voltage and extinguish thyratron 53 in preparation for functioning of the machine to read-out and record the information stored in the next row of cores to be interrogated. The polarity trap 43 (Fig. 4) functions at this time to provide a path for current caused to flow by the back E. M. F. of the magnet 70 during this period and also functions to prevent this reverse flow of current from traversing the windings 12.

Should it be desired to record the information read from a single card onto a plurality of other cards, the system is caused to restore the data to the matrix after it has been read out at each digit level. To effect this operation, the readback switch 107 (Fig. 4) is closed, and the cam contact 108 is caused to close prior to opening of the contacts 41. This switch closure completes a circuit from the +56 volt source 42 through cam operated switch 108, switch 107, conductor 106 and the cam contact 105, which closes as shown in Fig. 7, through lead 110, resistor 22 and lead 21 and thence through winding 11 at the "8" row to the grounded conductor 20. The current flowing through winding 11 via this path and that flowing through winding 12 and the conducting thyratron 53 as heretofore described, now is applied simultaneously and in proper direction to jointly produce an M. M. F. of sufficient magnitude (+2H) to return the "8" core in column 1 to its stored state of remanence. Thus, with the switch 107 closed, each time information stored in the cores is read out, it is read back into storage and the read-out operation can be repeated as many times as desired. With the switch 107 open, the pulse from condenser 81 restores the cores to their "zero" state and at the conclusion of a read-out operation when a succeeding card is to be sensed, the unit is operated for one cycle with this switch open to reset all the cores to "zero" and therefore clear the matrix of previously stored information.

With the example taken of a 9 stored in the "1" and "8" cores of column 1, the succeeding contacts made by brush arm 92 of the emitter produce no induced pulses in the windings 12 until segment "1" is reached. At this instant, the tube 75 is fired and the pulse induced in winding 12 fires the thyratron 53 a second time and, in the manner previously described, magnet 70 is again energized to operate the punch or other recording elements. At this instant, the increased capacity card has been advanced to the "1" position as it is fed in synchronism with the emitter 92 and the card will be perforated in this position. With the switch 107 closed during the complete read-out cycle, the core "1" in column 1 again is restored to its stored remanence state in a manner such as described in connection with core "8."

The information read from the decimal card has now been recorded in modified binary form in the increased capacity card and, if desired, additional increased capacity cards may be provided with the same information from the one sensing operation. Relay 93, illustrated in Fig. 4, when operated in a first position as described, connects the segments 91 of the emitter for recording the stored information as perforations in the upper deck of the card, however, with the relay 93 operated to its second position, the recording may be made in the lower deck as desired. Further arrangements are contemplated whereby the information may be partially stored in both the upper and lower decks by means of additional switching systems.

As a furtherance of the above described system, it is contemplated that a second matrix array of magnetic cores be provided linked by the same windings 12 which embrace the columns of cores of the first but with a separate group of windings 11. By means of switching, the windings 11 of the first matrix may be disconnected and those of the second matrix connected to conductors 21 with both the upper and lower deck of the emitter connected to the leads 86 so that data read in decimal form from two cards may be recorded in a single card of increased capacity in one pass of the card.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is contemplated, for example, that the matrix switching principle may be employed in any system where it is desired to store and convert electrical impulses of one code to electrical impulses of a second code. It is the intention, therefore, to be limited only as indicated by the scope of the following claims.

What is claimed is:

1. A record converter comprising in combination, sensing means adapted to read information represented by perforations in a record card having columns of information representing index positions in accordance with a first code wherein said index positions are sensed in succession, a storage matrix adapted for storage of information in accordance with a second code and employing a plurality of bistable magnetic elements arranged in columns with the number of elements in each column conforming to said second code and with the information represented as relative stable states of magnetic remanence, means coupling said sensing means and said storage matrix, means operated in synchronism with said sensing means for activating certain combinations of said elements during the sensing of successive index positions whereby information read by said sensing means is simultaneously converted to said second code and stored in said matrix, means for reading information from said matrix in the form of electrical impulses and further means for restoring the elements to the remanence state attained prior to interrogation so that the information may be recorded in a portion of one or more duplicated records having columns of information representing index positions in accordance with said second code, said further means including apparatus for activating certain combinations of said elements subsequent to operation of said means for reading information and in coincidence with said electrical impulses.

2. A record converter comprising in combination, sensing means adapted to read information represented by perforations in a record card having columns of information representing index positions in accordance with a first code wherein said index positions are sensed in succession, a storage matrix comprising an array of bistable magnetic elements arranged in columns wherein the number of elements in each column conforms with the index positions of a second code and the information is represented as relative stable states of magnetic remanence, means coupling said sensing means and said storage matrix, means operated in synchronism with said sensing means for activating certain of said elements during the sensing of successive index positions whereby information read by said sensing means is simultaneously converted to said second code and stored in said matrix, and means coupled with said matrix for determining the information stored therein and for recording it in a portion of one or more record cards having columns of index positions arranged in accordance with said second code.

3. A converter and storage device comprising a coordinate array of bistable magnetic cores having a first set of windings inductively associated therewith along one coordinate dimension, means for applying differentially timed electrical impulses to individual ones of the windings of said first set wherein the timing of said electrical impulses is representative of alphabetical and numerical information in accordance with a first code, a second set of windings inductively associated with said cores along another coordinate dimension of the array, means for applying electrical impulses to predetermined combinations of the windings of said second set in accordance with a second code and at times corresponding to the value of said differentially timed impulses whereby selected combinations of said cores are affected by coincident energization of windings of said first and second set and caused to change from one stable remanence state to the other stable remanence state in accordance with said second code to thereby simultaneously convert and store the applied information.

4. A converter and storage device as set forth in claim 3 including read-out means for applying electrical impulses to individual ones of said second set of windings in sequence whereby differentially timed electrical output impulses are developed on the windings of said first set in accordance with said second code.

5. A converter and storage device as set forth in claim 4 including read back means for applying electrical impulses to predetermined combinations of the windings of said second set subsequent to operation of said read-out means and simultaneously with said output pulses whereby those cores in which information had been stored are restored to the remanence state attained prior to operation of said read-out means so that the coded information may be repeatedly read out.

6. A combination code converter and storage device comprising an array of bistable magnetic cores arranged in columns corresponding in number to the components of a multi-part information item to be stored and having in each column a core for each one of a plurality of designations employed in accordance with a first code, winding means individual to the cores in each of said columns, means for applying differentially timed electrical impulses to said winding means during an input interval wherein the timing of said impulses is representative of the information in accordance with a second code, further winding means individual to cores in each column having like designations in accordance with said first code, means for applying electrical impulses to particular combinations of said further winding means in sequence during said input interval whereby certain combinations of said cores are jointly acted upon by said impulses and are caused to change from one remanence state to another in simultaneously storing and converting the information from said second code to said first code.

7. A combination code converter and storage device as set forth in claim 6 including read out means for applying electrical impulses to individual ones of said further winding means in sequence whereby differentially timed electrical output pulses are developed on said winding means in accordance with said first code.

8. A combination code converter and storage device as set forth in claim 7 including read back means for applying electrical impulses to predetermined combinations of said further winding means subsequent to the operation of said read out means and simultaneously with said output pulses whereby those cores in which information had been stored are restored to the remanence state attained prior to operation of said read out means so that the information may be repeatedly read out.

9. A combination code converter and storage device as set forth in claim 8 including a thyratron discharge device coupled to said winding means, and means including a capacitor coupled with said thyratron and discharged through said thyratron and said winding means on conduction thereof during operation of said read back means.

10. A punched card converter comprising in combination, sensing means adapted to read numerical and alphabetical information represented by perforations in columns of a record card having index positions successively arranged in each column in accordance with a first code form, an array of storage elements adapted to store information in a second code form, circuit means interconnecting said sensing means and said array for directing information impulses thereto, means sequentially conditioning certain combinations of said storage elements in accordance with said second code during the sensing of successive index positions for converting information directed to said array by said sensing means to said second code form and simultaneously storing said information, and means for reading out the information stored in said array in said second code form for recording as perforations in a further record card.

References Cited in the file of this patent

UNITED STATES PATENTS

| | | |
|---|---|---|
| 1,839,402 | Lorant | Jan. 5, 1932 |
| 2,302,002 | Bryce | Nov. 17, 1942 |
| 2,451,752 | Lake et al. | Oct. 19, 1948 |
| 2,595,889 | Ryffel et al. | May 6, 1952 |
| 2,691,154 | Rajchman | Oct. 5, 1954 |
| 2,691,155 | Rosenberg et al. | Oct. 5, 1954 |
| 2,702,380 | Brustman et al. | Feb. 15, 1955 |

OTHER REFERENCES

Rajchman: "Static magnetic matrix memory and switching circuits," R. C. A. Review, January 1952, pp. 183–201. (Photostat available in Div. 42).